United States Patent
Baker, Jr.

(10) Patent No.: US 6,417,597 B1
(45) Date of Patent: Jul. 9, 2002

(54) GRAVITATIONAL WAVE GENERATOR

(75) Inventor: Robert M. L. Baker, Jr., 8123 Tuscany Ave., Playa del Rey, CA (US) 90293

(73) Assignees: Robert M. L. Baker, Jr.; Bonnie Baker, Playa Del Rey, CA (US); Trustees of the Dr. Robert and Bonnie Baker, Jr. Family Trust Dated Oct. 21, 1992 in part interest ( * ) Notice: Subject to any disclaimer, the term of this patent is extended or adjusted under 35 U.S.C. 154(b) by 0 days.

(21) Appl. No.: 09/616,683

(22) Filed: Jul. 14, 2000

Related U.S. Application Data

(63) Continuation-in-part of application No. 09/443,527, filed on Nov. 19, 1999, now Pat. No. 6,160,336.

(51) Int. Cl.⁷ .............................. G21H 3/00; G21H 1/00
(52) U.S. Cl. ...................... 310/300; 310/311; 700/286; 976/DIG. 403; 976/DIG. 405
(58) Field of Search ................................. 310/300, 311; 700/286; 976/DIG. 403, DIG. 405; 376/153

(56) References Cited

U.S. PATENT DOCUMENTS

| | | | | |
|---|---|---|---|---|
| 2,719,944 A | | 10/1955 | Brailsford | 318/254 |
| 2,814,769 A | | 11/1957 | Williams | 318/171 |
| 3,612,630 A | | 10/1971 | Rosensweig | 308/10 |
| 3,667,019 A | | 5/1972 | Elliott et al. | 318/254 |
| 3,722,288 A | * | 3/1973 | Weber | 73/382 |
| 3,903,463 A | | 9/1975 | Kanamori | 318/138 |
| 3,959,700 A | | 5/1976 | Sugiura et al. | 318/138 |
| 4,035,658 A | | 7/1977 | Diggs | 290/55 |
| 4,052,134 A | | 10/1977 | Rumsey | 416/119 |
| 4,086,505 A | | 4/1978 | McDonald | 310/74 |
| 4,546,264 A | * | 10/1985 | Pinson | 290/54 |
| 4,874,942 A | * | 10/1989 | Clauser | 250/251 |
| 5,398,571 A | | 3/1995 | Lewis | 74/572 |
| 5,446,018 A | | 8/1995 | Takahata et al. | 310/90.5 |
| 5,495,515 A | * | 2/1996 | Imasaki | 378/119 |
| 5,513,530 A | * | 5/1996 | Ney et al. | 73/382 R |
| 5,514,923 A | * | 5/1996 | Gossler et al. | 310/74 |
| 5,646,728 A | | 7/1997 | Coutsomitros | 356/352 |
| 5,721,461 A | * | 2/1998 | Taylor | 310/268 |
| 5,831,362 A | | 11/1998 | Chu et al. | 310/90.5 |
| 5,929,579 A | | 7/1999 | Hsu | 318/439 |

FOREIGN PATENT DOCUMENTS

| GB | 1333343 | 10/1973 | ............ B01D/3/06 |
|---|---|---|---|

OTHER PUBLICATIONS

Chakrabarty, "Gravitational Waves: An Introduction," Aug. 21, 1999, Physics, pp. 1–21.*
J. Weber, "Gravitational Waves" in *Gravitation and Relativity*, Chapter 5, pp. 90–105 (W.A. Benjamin, Inc., New York, 1964).

(List continued on next page.)

*Primary Examiner*—Burton S. Mullins
(74) *Attorney, Agent, or Firm*—Christie, Parker & Hale, LLP

(57) ABSTRACT

A gravitational wave generation device comprising an ensemble of energizable elements involving magnetic, electrical and electromechanical functions that are under the control of a computer and attendant computer software system. The magnetic and electrical force elements, when energized as directed by the computer, operate in concert to produce a rapid third-time-derivative motion of a mass. This action causes the generation of high-frequency gravitational waves that can be modulated and shaped in order to be utilized for communication, propulsion, and various physics experiments. The energizable elements can be very small coils or coil sets encased in a computer chip, current-carrying conductors, or small electromechanical devices. The mass acted upon by the coil elements can be a permanent magnet or magnets, or electromagnets. In the electromechanical-element configuration the device can be used both for the generation of gravitational waves and their detection.

50 Claims, 5 Drawing Sheets

OTHER PUBLICATIONS

J. Weber, "Detection and Generation of Gravitational Waves", *Physical Review*, (1960) vol. 117, No. 1, pp. 306–313.

J. Weber, "Gravitational Radiation from the Pulsars", *Physical Review Letters*, (1968) vol. 21, No. 6, pp. 395–396.

Robert L. Forward and Larry R. Miller "Generation and Detection of Dynamic Gravitational–Gradient Fields", Hughes Research Laboratories, Aug. 5, 1966, pp. 512–518.

F. Romero B., et al., Generation of Gravitational Radiation in the Laboratory, Fakultät für Physik der Universität Konstanz, Z. Naturforsch 36a, 948–955 (1981).

Richard, Jean–Paul, Recent developments in the measurement of space time curvature, Acta Astronautica, vol. 5, pp. 63–76. Pergamon Press 1978.

* cited by examiner-

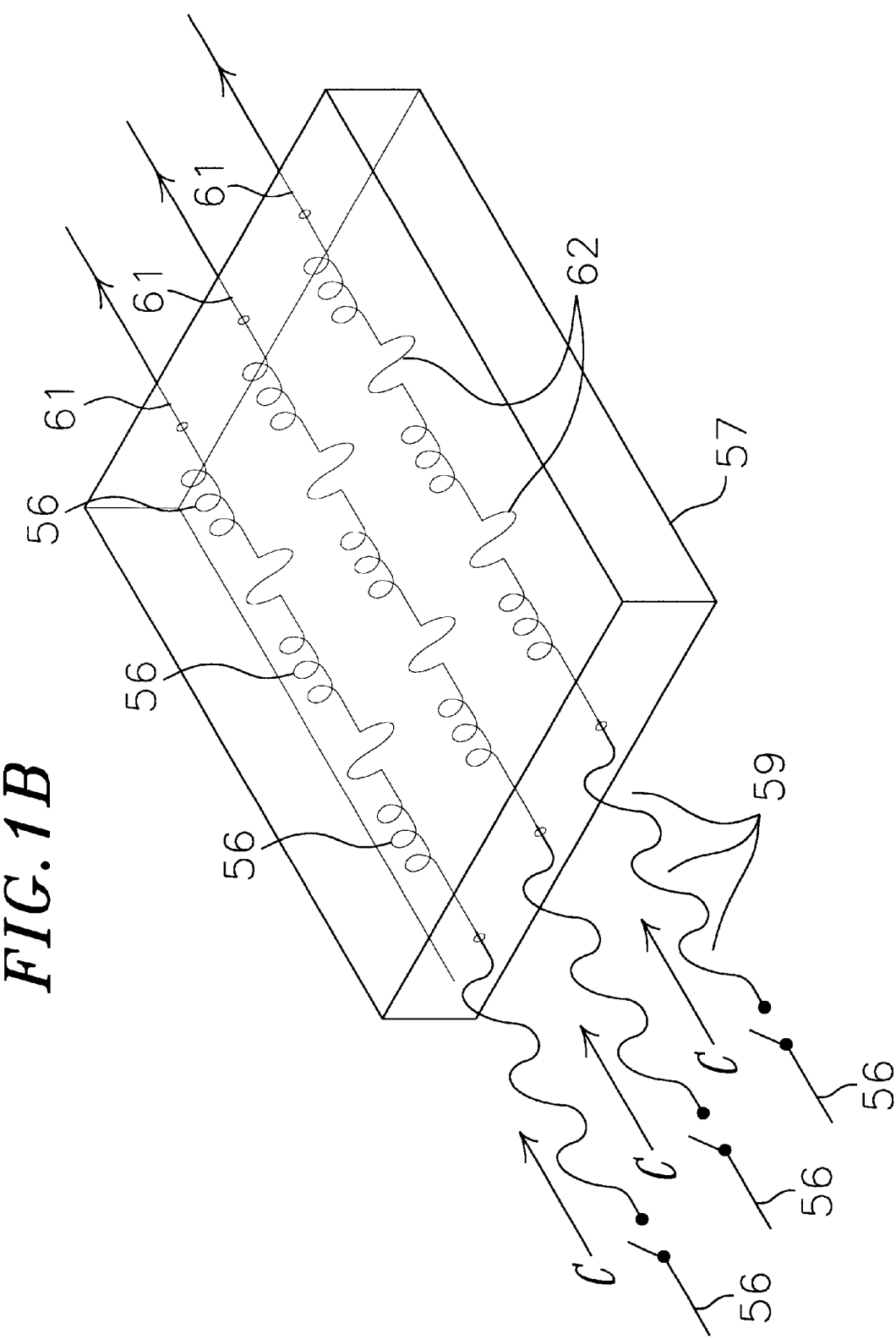

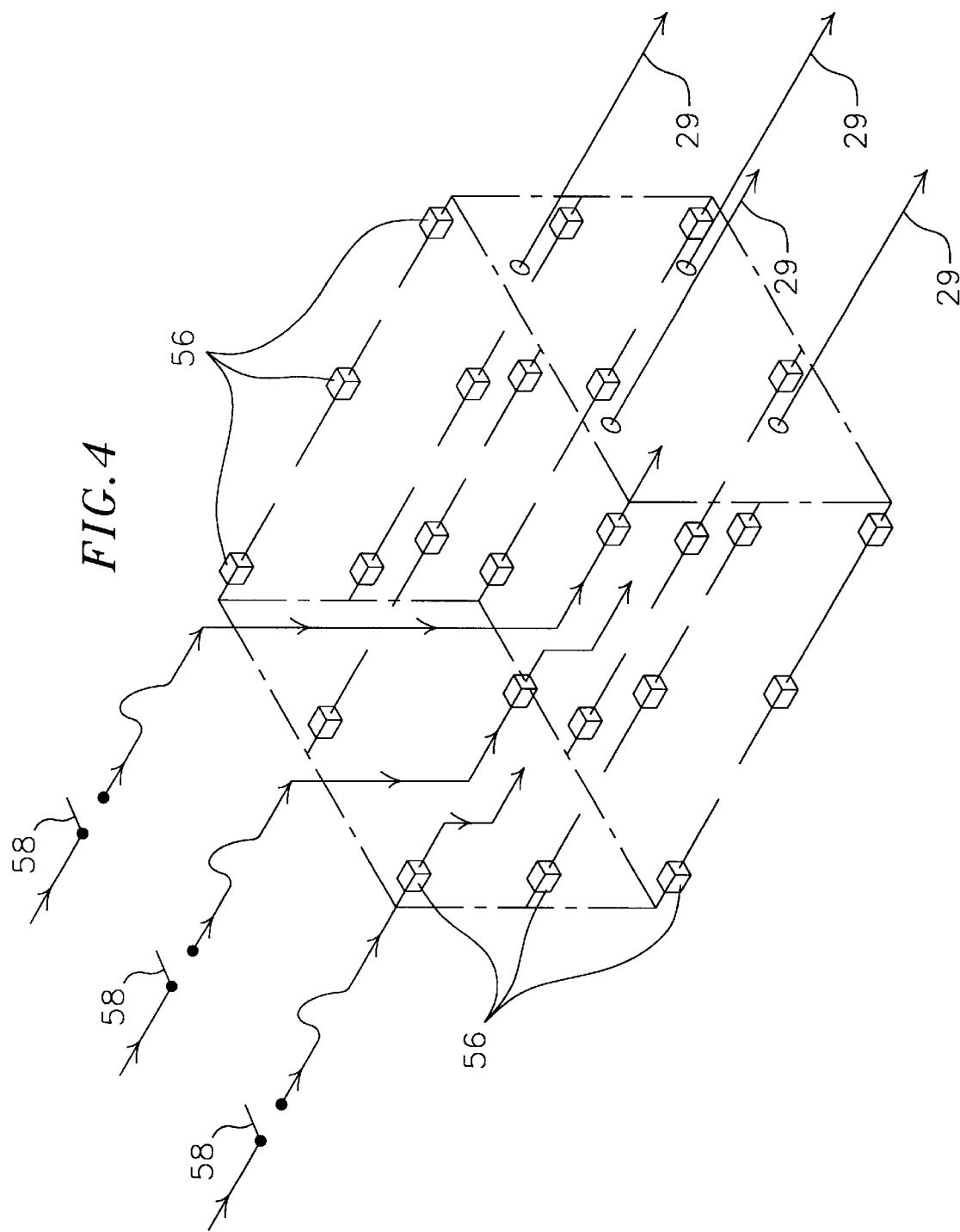

GRAVITATIONAL WAVE GENERATOR

REFERENCE TO RELATED INVENTION

The present application is a continuation-in-part of application Ser. No. 09/443,527, filed Nov. 19, 1999, now U.S. Pat. No. 6,160,336 entitled Peak Power Energy Storage Device and Gravitational Wave Generator which is incorporated herein by reference.

BACKGROUND OF THE INVENTION

This invention relates to the generation of high-frequency gravitational waves that can be modulated and utilized for communication, propulsion and for the purpose of testing new physical theories, concepts, and conjectures. More particularly this invention relates to a combination of small energizable elements operatively connected to a computer working in concert to produce a third-time-derivative motion of a nearby mass or electromechanical elements that generates a high-frequency gravitational wave. The invention also relates to the detection of gravitational waves.

DESCRIPTION OF THE PRIOR ART

Albert Einstein in his General Theory of Relativity predicted gravitational waves (GW). Such waves have never been detected, but an extra-terrestrial source of low-frequency GW, namely a neutron double star pair, has been observed to coalesce at a rate exactly as predicted if it radiated GW. The production of GW having a high frequency and generated by relatively strong magnetic, electrical and electromechanical forces acting on relatively small masses rather than by the relatively weak gravitational forces acting on large celestial masses is not known.

The prior art indicates that gravitational-wave generators are theorized although not reduced to practice. Joseph Weber in "Detection and Generation of Gravitational Waves", *Physical Review*, Volume 117, Number 1, January, 1960, p. 313 has proposed electromechanical-force-produced GW by use of piezoelectric crystals: "Waves one meter long could be radiated by a crystal with dimensions about fifty centimeters on a side. If it is driven just below the breaking point, each crystal would radiate $\approx 10^{-20}$ [watts], assuming $P_{max}$ to be its static published value." No one has, however, put such a device in practice.

According to Robert L. Forward a gravitational-wave generator could be constructed by means of a tube in which very dense Newtonium (element 127) is caused to move up-and-down the tube at high-speed (not really a dipole since as Joseph Weber indicated {"Gravitational Waves" in *Gravitation and Relativity*, Chapter 5,W. A. Benjamin, Inc., New York, 1964, p. 91} the lowest order of gravitational radiation from a system cannot be a dipole, but must be a quadrupole). However no drawings or other descriptions of such a generator are known that are sufficiently specific to enable a person skilled in the art to practice the generator.

As described in the parent patent, there is considerable prior art in the detection of gravitational waves including U.S. Pat. No. 5,646,728, which involves a very low amplitude interferometer instrument suitable for detecting gravitational waves. This prior art involves only the detection of low-frequency (below a MHz) gravitational waves generated by natural processes, such as astrophysical or celestial events. It is believed that there is no prior art in the detection of high-frequency gravitational waves that are artificially generated for communication or other purposes.

SUMMARY OF THE INVENTION

The present invention relies upon the fact that the rapid movement or "jerk" of a mass or the rapid change or "jerk" in angular momentum with time, over a period of time such as a picosecond caused by the operation of the present invention, will produce a quadrupole moment and generate a sequence or train of useful high-frequency, for example Tera Hertz (THz), gravitational waves (GW). The device described will accomplish this GW generation in several alternative ways based upon the device's rotating and non-rotating, symmetrical and non-symmetrical masses acted upon by means of relatively strong magnetic, electrical and electromechanical forces. Such forces are produced by an ensemble of very small, sub-millimeter, energizable elements operating in concert under the control of the device's computer. As noted, this process is substantially different from the extra-terrestrial generation of low-frequency GW by very large rotating and non-rotating celestial masses acted upon by relatively weak gravitational forces.

Gravitational waves are absorbed differently and propagate differently through matter and space than do electromagnetic waves. Thus gravitational waves may offer advantages over electromagnetic waves in that they can be transmitted through material opaque to electromagnetic waves and their intensity may fall off less rapidly with distance than electromagnetic waves. Up to now man-made machines in use do not generate significant or measurable GW.

BRIEF DESCRIPTION OF THE DRAWINGS

The foregoing features and advantages of the present invention will be more fully understood by reference to the following detailed description of the invention when considered in connection with the accompanying drawings in which:

FIG. 1A and FIG. 1B are schematic views of coil sets 56 embedded in or imprinted on a silicon chip 57 and connected to transistors or ultra-fast switches 58 in order to generate current pulses 59 in the magnetic field of the permanent magnets 60;

FIG. 4 is a schematic view of the utilization of electromechanical elements 65 that act in concert to generate and detect gravitational waves 29.

Analysis of Binary Pulsar PSR 1913+16

Figure 1A:
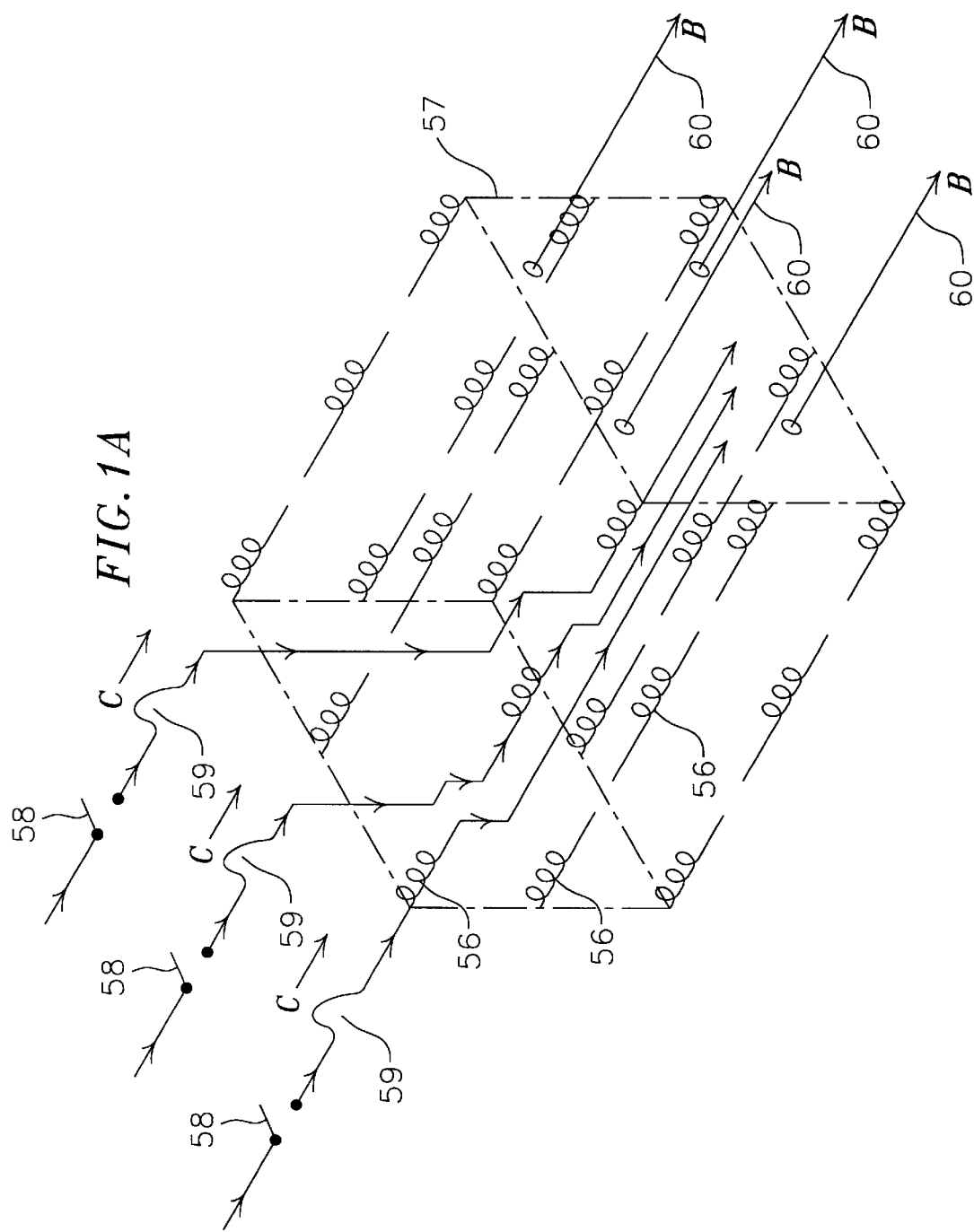

Since the observation of the binary pulsar PSR 1913+16 represents the only experimental confirmation of GW, the features and advantages of the present invention will be better understood by the analyses of such a double-star system. This pair of neutron stars will coalesce in $3.5 \times 10^8$ years due to GW radiation and produce a rather continuous GW until that time. According to J. H. Taylor, Jr. in "Binary pulsars and relativistic gravity", *Reviews of Modern Physics*, Volume 66, Number 3, July, 1994, pp. 711–719, the period of their mutual rotation is 7.75 hours (or $2.79 \times 10^4$ [sec]), periastron is 1.1 solar radii (one solar radius is $6.965 \times 10^8$ [m]), and apastron is 4.8 solar radii. It's radius of gyration is essentially the semi-major axis=$(1.1+4.8)/2=2.95$ solar radii=$(2.95)$ $(6.965 \times 10^8)=2.05 \times 10^9$ [m]. The neutron stars exhibit a mass of about 1.4 solar masses so that together their mass is (2) (1.4) $(1.987 \times 10^{30})=5.56 \times 10^{30}$ [kg]. Thus the moment of inertia of the binary-pulsar system is approximately $(5.56 \times 10^{30})$ $(2.05 \times 10^9)^2 = 2.34 \times 10^{49}$ [kg-m$^2$]. The current angular rate of the system=$2\pi/2.79 \times 10^4 = 2.25 \times 10^{-4}$ [radians/sec]. Thus the angular momentum of the system is currently, $I\omega = (2.34 \times 10^{49})$ $(2.25 \times 10^{-4}) = 5.27 \times 10^{45}$ [kg-m$^2$/sec]. According to a perusal of binary-star catalogs by John Mosley of the Griffith Observatory, the binary pulsar PSR 1913+16 is at a distance from our Sun of 23,300 light years. If there was little or no GW diffraction, then the reference area is a circular ribbon or strip having a width of the diameter of a neutron star, $3 \times 10^4$ [m]. Thus the reference area equals $(3 \times 10^4)$ $(2\pi)$ $(2.33 \times 10^4)$ $(9.5 \times 10^{15}$ meters per light year$) = 4.17 \times 10^{25}$ [m$^2$].

In the case of a binary star pair such as PSR 1913+16 the GW power, P, is computed from the quadrupole moment, which for two masses on orbit about one another is given, for example, by an equation on p. 356 of L. D. Landau and E. M. Lifshitz, *The Classical Theory of Fields*, Forth Revised English Edition, Pergamon Press, 1975. They give the time-variable factor in P as a function of the true anomaly, v, and orbital eccentricity, e, as $$(1+e \cos v)^4([1+\{e/12\}\cos v]^2 + e^2\sin^2 v)/(a[1-e^2])^5. \quad (1)$$

In conventional astrodynamic/celestial-mechanics notation this factor is $$p/r^6 + (dr/d\tau)^2/12\mu r^4, \quad (2)$$

where p is the orbital "parameter" or semilatus rectum [AU], r is the radial distance between the two masses [AU], $\tau$ is the characteristic time measured in $k_s$days or in units of $5.0022 \times 10^6$ [s] for heliocentric-unit systems, and $\mu$ is the sum of the two masses [solar masses]. Note that one AU (astronomical unit)=$1.496 \times 10^{11}$ [m] and one solar mass=$1.987 \times 10^{30}$ [kg]. The $dr/d\tau$ term is related to $dI/d\tau$ $(=2\mu r[dr/d\tau])$, $d^3I/d\tau^3$ $(=-2\mu^2[dr/d\tau]/r^2)$, $d^2v/d\tau^2$ $(=-\sqrt{\mu}p[dr/d\tau]/r^3)$, and $d^3v/d\tau^3$ $(=-2\mu\sqrt{\mu}p[1/r-1/a-4\{dr/d\tau\}^2/\mu]/r^4)$, where a=the semi-major axis of the orbit [AU] and for a circular orbit $dr/d\tau=0$. These time derivatives are directly related to the embodiments of the invention.

The GW power radiated, P, which causes a perturbation in the semi-major axis, a, (and an attendant secular decrease in the orbital period) is obtained by integrating the time-variable factor, Eq. (2), over the orbital period using the mean anomaly, M, which is directly proportional to the time (that is, M=n [t-T], where n is the mean motion [$=\omega$ in Landau and Lifshitz's {ibid, p. 357} notation] and T is the time of periastron passage). The value of the average GW power, P, is computed from observations that define the eccentricity (based primarily upon Doppler-shift determination of the range rate at periastron and apastron), semi-major axis, and orbital orientation angles of PSR 1913+16. The error in the computed value of P is related to the observational error leading to the determination of the orbital elements as well as the determination of the masses of the pair of neutron stars, $\mu=m_1+m_2=1.4+1.4=2.8$ [solar masses]. For example, a 0.1 percent change in the measurement of range rate at periastron results in a 0.28 percent change in GW power, P, and a 0.1 percent change in the mass of the stars results in a 0.33 percent change in GW power.

The observed accumulated shift in the times of periastron passage, T, caused by the secular shortening of the orbital period of PSR 1913+16, compares closely, within observational error, to that predicted by General Relativity and confirms the existence of GW radiation. Likewise is confirmed the existence of a $dr/d\tau$ component, which is related to $d^2\omega/dt^2$ ($\approx d^3v/d\tau^3$) and $d^3I/dt^3$, that are involved in the GW-generator embodiments of the invention The average GW power, P, established by Landau and Lifshitz (ibid, p. 357) by analytically integrating and given as a function of eccentricity, e, is for e=0.641, $9.28 \times 10^{24}$ [watts] so for the disk reference area the GW flux at the Sun's distance=$9.28 \times 10^{24}/4.17 \times 10^{25} = 0.222$ [watts/m$^2$]. If the GW is totally diffracted and the propagation is spherically isotropic, then the GW flux at the Sun's distance= $9.28 \times 10^{24}/(4\pi[2.33 \times 10^4 \times 9.5 \times 10^{15}]^2) = 1.51 \times 10^{-17}$ [watts/m$^2$]. By numerically integrating (see, for example, an algorithm found in R. L. M. Baker, Jr., *Astrodynamics, Applications and Advanced Topics*, Academic Press, New York, 1967, pp. 263–272) over the mean anomaly (directly proportional to time) the average GW power, P, is $9.296 \times 10^{24}$ [watts]. The peak GW power, $1.73 \times 10^{26}$ [watts] occurs at the time of periastron passage (every 7.75 hours) and at the Sun's distance would result in a GW flux of $1.73 \times 10^{26}/(4\pi[2.33 \times 10^4 \times 9.5 \times 10^{15}]^2) = 2.81 \times 10^{-16}$ [watts/m$^2$] if the GW were totally diffracted and the propagation were spherically isotropic. If GW detectors were sensitive enough to detect such an intensity and they did not, then it would lend credence to the disk-like propagation of GW waves or at least to diffraction of GW less than 45 degrees from the orbit plane of PSR 1913+16 at the Sun's distance.

Individual Independently Programmable Coil System (IIPCS)

Of fundamental importance to the operation of the present invention is the Individual Independently Programmable Coil System (IIPCS) described and illustrated in parent patent U.S. Pat. No. 6,160,336. This system, is enabled by a computer and associated computer software, to control a system of either transistors or of ultra-fast switches. The switches rapidly turn off or on a myriad of sub-millimeter coils, current-carrying conductors and/or electromechanical elements and generate magnetic (or electromechanical) force to produce a third time derivative or "jerk" or, alternatively, a harmonic oscillation of a mass or masses.

For a very large number of ultra-small, sub-millimeter coil elements involved in some of the embodiments of this invention a miniaturized integrated circuit can be utilized. They are embedded in or imprinted on a silicon chip, organic material, or in connection with polymer-based devices. They consist of multiple layers, with appropriate sequencing time delays to ensure near simultaneity of the magnetic field's interaction with individual elements, as in FIG. 1A, or as the direct-current train of approximately one-picosecond pulses, which traverse each coil set on the chip levels, as in FIG. 1B and possibly integrated in the chip with the ultra-fast switches or transistors or other semi-conductors. Although switches or transistors having picosecond capability are utilized in the various numerical examples, much slower switches or transistors could be utilized to successfully practice the invention. A preferred embodiment utilizes conventional computer chips, containing the IIPCS circuit elements about 18 micrometers or less apart, synchronizing clock, input/output ports, and sub-millimeter coils on 50 to 100 micrometer centers. The chips are about 6 mm to 9 mm square and are obtained from silicon wafers. These chips are sewn into a circuit-board roll with an approximately 25-micrometer-diameter gold thread. Several layers of this roll (for example, 25) are connected in a fixed location or band adjacent to the moving spindle's rim and form the IIPCS in the spindle rim's magnetic field. Such rolls are routinely fabricated by French-owned Oberthur Card Systems (plant in Rancho Dominguez, Calif.), French-based Gemplus, Schlumberger (Paris and New York), and California-based Frost & Sullivan.

In the miniaturized integrated circuit situation, as exhibited in FIG. 1A, there will be a very large number of small, sub-millimeter coil sets or elements 56 embedded in or imprinted upon a silicon chip 57 in multiple layers. Ultra-fast switches or transistors of the IIPCS 58 will launch a series of current pulses 59 of approximately picosecond duration moving at the electron's mobility speed, c, that will be timed to reach the individual coil sets or elements almost simultaneously along several individual wire conductors, as in FIG. 1A, or one single wire conductor per line, as in FIG. 1B, and thereby interact with the magnetic field 60 in concert. This interaction will result in a third-time-derivative motion or jerk of the magnetic mass to generate a train of gravitational waves. The ultra-fast switches are preferably semiconductor-based, such as a semiconductor optical amplifier (SOA) or a semiconductor nonlinear interferometer such as a nonlinear Sagnac interferometer on a phosphide semiconductor chip, etc. (see, for example, D. Cotter, et al, "Non-linear Optics for High-speed Digital Information Processing", *Science*, Volume 286, Nov. 19, 1999, pp. 1523–1528). In FIG. 1B, the IIPCS and its array of ultra-fast switches is programmed to launch a train of current pulses or intervals of approximately a picosecond duration 59 such that each member of the pulse train will reach each of the coils or coil sets at the same time. The pulse train can consist of stretches of constant or zero current. The duration of the pulses will be such to completely energize any given coil set as it passes through it in order to produce a magnetic field interaction. The interaction will result in a third-time-derivative lateral motion or jerk of a cylindrical, central magnetic core 63 shown in FIG. 2 and, as will be discussed, generate a GW train 29, which propagates both in the direction of and opposite to the direction of the jerk as illustrated in FIGS. 8A and 8B of U.S. Pat. No. 6,160,336. This core, piston, or barrel 63 is surrounded by and immediately adjacent to a sheath 68 of IIPCS-controlled coil sets 64. In the case of the current-pulse train on a single conductor wire interconnecting a line of coils or coil sets, there will be a build up of impulses to full value as the current-impulse train progresses down the line of coil sets. Use of a single conductor wire for each line of coils or coil sets reduces the resistive power loss. In order to transmit information, all pulses in the train may not be present or they may be at different amplitude thereby modulating the GW. Portions or stretches of the pulse train could also be intervals of constant current. In each line of coils set in series along one conductor wire 61 there will be time delays 62 between coil sets to ensure simultaneity of the current pulses reaching any given coil set.

Figure 3:
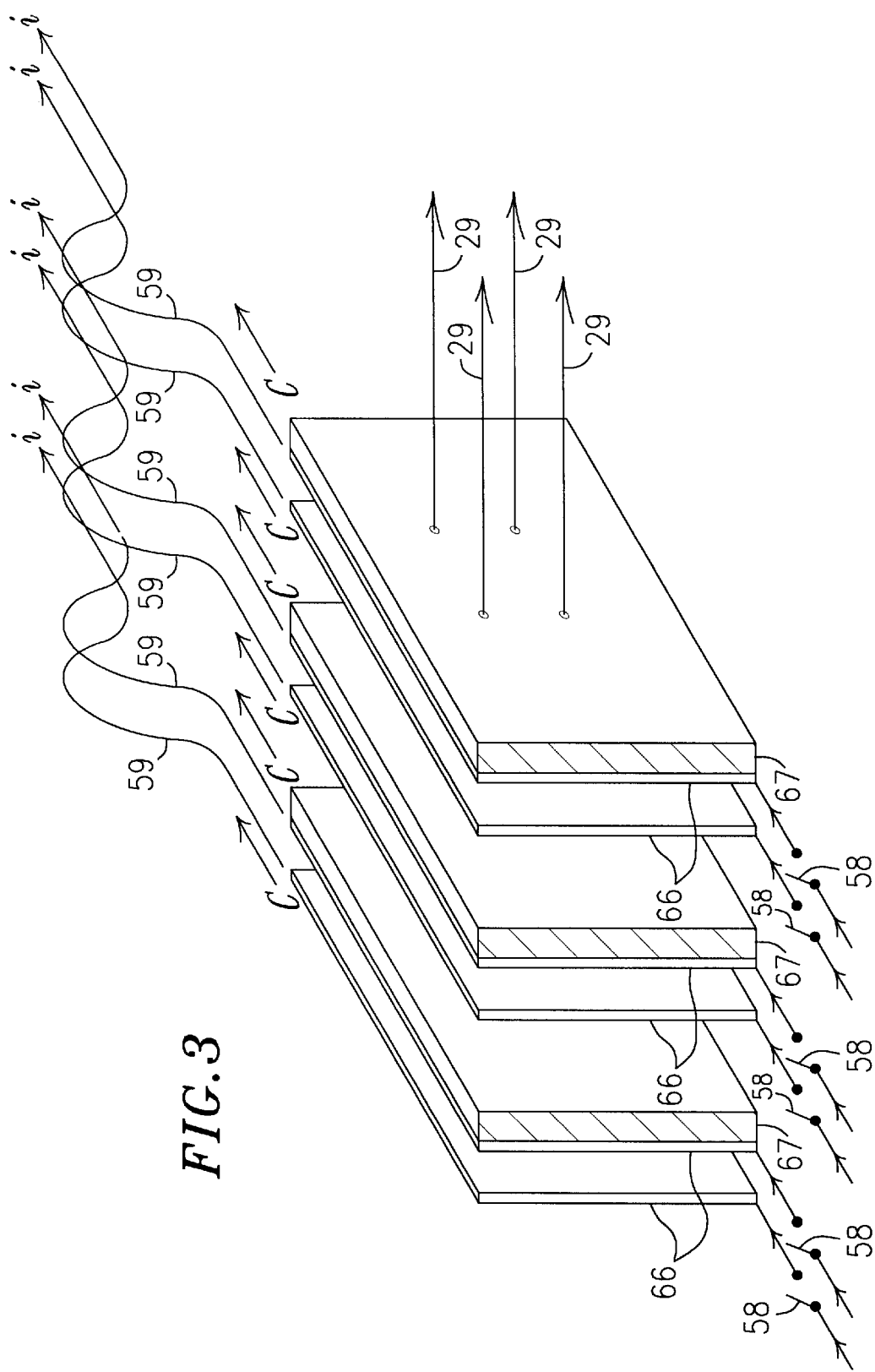
FIG. 3 is a schematic view of infinite-radius coils evolved into parallel plate conductors 66, which may have ballast 67 attached in order to vary their masses, connected to fast switches 58 in order to generate current pulses 59 acting in concert to generate a train of gravitational waves 29 (which propagate in both directions from the jerk since there is a square associated with the kernel of the quadrupole equation (3)—so there is no preferred direction along the axis of the jerk)

In FIG. 3, ultra-fast switches or transistors of the IIPCS 58 will launch a series of current pulses acting in either direction 59 of approximately picosecond duration moving at the electron's mobility speed, c, along individual conductors or single interconnecting conductor wires in order to produce current pulses 59, acting in concert to generate a modulated gravitational wave 29. The current pulses will be timed to reach individual parallel-plate conductors 66, which may have different masses or may have ballast 67 attached and/or carry different current and/or have different modulus of elasticity and/or are constructed differently in their mounting for the purpose of exhibiting high-frequency asymmetrical mass displacements.

In FIG. 4, ultra-fast switches or transistors of the IIPCS 58 will launch a series of current pulses 59 of approximately picosecond duration moving at the electron's mobility speed, c, along individual conductors or single interconnecting conductor wires that will be times to reach individual, sub-millimeter electrical or electromechanical-force elements 55 in sequence to reinforce the build up or modulation of a GW beam 29. The ensemble of electrical or electromagnetic force elements will be embedded in or imprinted on a silicon chip 57 in multiple layers.

Quadrupole Moment

Although the specific relationship for GW generation will be an outcome of the experimental use of the invention; as an example of that relationship consider the standard GW quadrupole Eq. (110.16), p. 355 of L. D. Landau and E. M. Lifshitz (opcit) or Eq. (1), p. 463 of J. P. Ostriker, ("Astrophysical Sources of Gravitational Radiation" in *Sources of Gravitational Radiation*, Edited by L. L. Smarr, Cambridge University Press, 1979) which gives the GW radiated power [watts] as $$P=-dE/dt=-(G/45c^5)\,(d^3D_{\alpha\beta}/dt^3)^2 \text{ [watts]} \qquad (3)$$

where

E=energy [joules], t=time [s],

G=$6.67423 \times 10^{-11}$ [m$^3$/kg-s$^2$] (universal gravitational constant), c=$3 \times 10^8$ [m/s] (the speed of light, approximately the electron's mobility speed in the conductor), and $D_{\alpha\beta}$ [kg-m$^2$] is the quadrupole moment-of-inertia tensor of the mass of the device, and the $\alpha$ and $\beta$ subscripts signify the tensor components and directions.

Note especially the third time derivative in the squared term or kernel (that is, $(d^3D_{\alpha\beta/dt}^3)^2$) of Eq. )3). Such a time-rate-of-change of the second derivative ("acceleration") is often referred to as a "jerk". Because the factor of this kernel is so small, $1.76 \times 10^{-52}$, the kernel and hence the jerk must be very large. In the following examples of GW generation by various devices, we shall often cite astrophysical analyses of the same GW formulation. It should be recognized, however, that although kernels are analogous in the invention and in the celestial astrophysical systems (or events) their operation is quite different. In most cases the astrophysically generated GW rely on rather slow-moving, low-frequency events (a fraction of a Hertz to possibly a MHz) and weak gravitational forces. On the other hand, the various embodiments of the invention rely on vary fast-moving, high-frequency events (in the THz range) and relatively strong magnetic, electrical or electromechanical forces.

DETAILED DESCRIPTION OF THE PREFERRED EMBODIMENTS

In order to understand the various embodiments of the invention it is useful to refer to the historical roots of GW generation. From Eq. (1), p. 90 of Joseph Weber (opcit, 1964) one has for Einstein's original formulation of the gravitational-wave (GW) radiated power of a rod spinning about an axis through its midpoint, having a time-constant moment of inertia, I [kg-m$^2$], and an angular rate, ω [radians/s]:

$$P=-(G/45c^5) \; ([\sqrt{2\times12}][I\omega^3])^{2--G(I\omega^3)^2}/5(c/2)^5 \text{[watts]}. \quad (4)$$

Equation (4) is an approximation and is, strictly speaking, only valid for lengths very much less than the GW wavelength and speeds of the rod's rotation less than c.

This is the same equation as that given for two bodies on a circular orbit (also exhibiting a time-constant moment of inertia) on p. 356 of Landau and Lifshitz, opcit (I=$\mu r^2$ in their notation) where ω=n, the orbital mean motion, and similar to all of the equations associated with the various embodiments of the invention. Although Eqs. (3) and (4) result from relativistic mechanics, classical mechanics (such as the use of the conventional moment of inertia in Eq. (4)) will be utilized herein to provide useful results.

Spindle-Device GW Generation Embodiment

It is reasonable (by appealing to simplicity, that is, by Ockham's Razor) to suggest that for the spin up/down of a spindle device, as referred to in the parent application, (referred to herein as the "(Id$^2$ω/dt$^2$)$^2$ formulation or component"):

$$P=-G \; \kappa_{I\omega2dot}(Id^2\omega/dt^2)^2/5(c/2)^5 \text{[watts]} \quad (5)$$

where $\kappa_{I\omega2dot}$=a dimensionless constant or function to be established by experiment and d$^2$ω/dt$^2$=second time derivative of the spindle's angular velocity, ω, or third time derivative of it's angle, termed, a "jerk". In fact, as noted by M. S. Turner and R. V. Wagoner "Gravitational Radiation from Slowly Rotating 'Supernova' Preliminary Results," in *Sources of Gravitational Radiation*, Edited by L. L. Smarr, Cambridge University Press , 1979, p. 383 that "If the angular velocity ω . . . is non-uniform, octupole (post-Newtonian) radiation is generated (in addition to the quadrupole (Newtonian) radiation . . . " (emphasis added) and on p. 385 they state "This radiation is generated not by non-spherical distribution of matter . . . , but by internal motions."

This third derivative, d$^2$ω/dt$^2$, is computed by introducing the equation of motion for a rotating body $$Id\omega/dt=rf \quad (6)$$

where r=radius of the spindle's rim [m] and f=force tangential to the rim [N].

The derivative is approximated by $$Id^2\omega/dt^2 \approx \Delta(Id\omega/dt)/\Delta t = \Delta(rf)/\Delta t = r\Delta f/\Delta t; \quad (7)$$

in which Δf is the nearly instantaneous increase in the force tangential to the rim or jerk caused by the magnetic field when it is turned on or turned off or pulsed by the transistors or ultra-fast switches of the Individual Independently Programmable Coil System (IIPCS), that is, a tangential jerk. Thus $$P=-1.76\times10^{-52}(\kappa_{I\omega2dot}r\Delta f/\Delta t)^2 \text{[watts]}. \quad (8)$$

(1) Numerical Example

As a numerical example, (for a spindle GW-generation device slightly different from the exemplar spindle shown in U.S. Pat. No. 6,160,336) set $\kappa_{I\omega2dot}$=1 (subject to experimental determination later), r=1000 [m], Δf=1.8×10$^7$ [N], and Δt=10$^{-12}$ [s]. These numbers arise as follows: The rim is a thin (approximately one cm thick) band of Alnico 5 permanent magnets (or electromagnets) facing radially outward. In general, permanent magnets exhibit irregular magnetic fields and associated forces. As a rule of thumb such a band of juxtaposed magnets will produce in excess of 30 pounds per 1.75 inches (or 206 pounds per foot) of tangential rim force. Each 1.75-inch magnet has a flux density, B, of about 2,600 gauss or 0.26 [Tesla] developed every 4.4 cm. The kilometer-radius rim is a large hoop connected to a central spindle/hub as described in the parent patent. The IIPCS coil sets at the rim's periphery, when switched on generate a 0.26 [Tesla] flux density every 0.044 [m] and produce in excess of a 200 pound per foot or 3000 [N/m], which is defined as Δf/Δl, or impulse of tangential force every meter on the rim (that is, a force built-up almost to full value during spin up in approximately a picosecond and a similar build up of retarding force during spin down) . Since the rim's circumference is 2π (1000) (3.28 feet per meter)= 20,600 feet, the tangential rim force produced when the coils are fully energized is 4.1×10$^6$ pounds or 1.8×10$^7$ [N]. The 10$^{-12}$ [s] intervals, with the coils turned turn on and then off, will generate a train of direct-current, approximately one-picosecond pulses. In each line of coils there will be an ultra-fast switch (such switches could be located near to the coils and each one energizing a large number of coil sets or else co-located with a central IIPCS control computer).

Inserting the numbers in Eq. (8) for the spindle's gravitational-wave (GW) power for the tangential jerk yields $$P=-1.76\times10^{-52}(2\times10^3\times1.8\times10^7/10^{-12})^2=-2.3\times10^{-7} \text{[watts]}. \quad (9)$$

The reference area of the 1 cm thick rim is (0.01) 2π(1000)= 63 [m$^2$], so that the GW energy flux is 3×10$^{-9}$ [watts/m$^2$]. For a time-constant value of I there may be a somewhat less simple, $\kappa_{I\omega dot\omega}([d\omega/dt]\omega)^2$, formulation or component of the GW power for spin up/down, but as will be seen, for most applications it is expected to result in a smaller power than the larger of the $\kappa_{I\omega2dot}(Id^2\omega/dt^2)^2$ or $(I\omega^3)^2$ formulations or components.

Note that the coil sets must be very close together. In order for the coils fields to interact with the whole rim's magnetic field and impart the mechanical impulse or jerk, they must be spaced no more than 0.3 mm or 300 [micrometers] apart (the distance light and, hence, the magnetic field and resulting impulse on the permanent magnets, travels in a picosecond). If all coil sets in a line of coil sets are connected in series by the same conductor, then each member of the pulse train traverses a 300-micrometer-length coil set, separated from the next coil set by a time delay circuit. Such a time-delay circuit could be simply a 300-micrometer-long jumper (see 62 in FIG. 1B) between coil sets. In this connection it is noted that if each coil set is connected by its own unique conductors as in FIG. 1A, instead of one single conductor wire along each line of coils, then the communications lines or conductors to all of the coil switches from the logic circuits of the control computer must be equal to better than 0.01 mm or 10 [micrometers] in order to ensure near simultaneity or proper timing. That is, the electrons must reach all of the coils sets at the appropriate time in less than approximately a fraction of a picosecond of time difference.

(2) Magnetic Field Build Up and Heat Loss

Although of little concern in most applications, the length of time to "build-up" the magnetic field of the coils is important here. The electrons must complete sufficient coil turns (moving at the electron's mobility speed or about light speed) in approximately a picosecond to "launch" most of the magnetic field that produces the impulsive force, "hammer blow" or jerk when it interacts with the static magnetic field of the permanent or electromagnets carried around by the rim or other magnetic mass. Thus, they must be very tightly wound with each coil "set" having a total length of less than 0.3 mm (0.0003[m] or 300 micrometers). If each of the ultra-small, sub-millimeter coil sets consist of two coils or turns, as exhibited in FIGS. 7A, 7B, 7C, 7D, 7E, 7F, 7G, and 7F, of the parent patent, then their diameters are on the order of d=0.3/2π=0.05[mm]=50 [micrometers] or less. The coil wire could be made of gold having about a 0.015-mm or 15-micrometer diameter. The resistance for such wire at room temperature is about 135 [ohms/m]—high-temperature superconducting material would be useful here. In the spin-up mode the IIPCS will need to build up 0.26 [Tesla] flux density every 0.044 [m] (the requirements for the spin-down mode are essentially the same, but reversed). Thus $$B = \mu_o n i / l [\text{Tesla}] \quad (10)$$

where $\mu_o = 4\pi \times 10^{-7}$ (permeability of free space), n is the number of coil turns, i is the current through the coils [amps], and l is the length of the coil conductors [m]. The double coil sets will be placed on 50 to 100 [micrometer] centers, so that there will be about $2 \times 100 \times 100 = 2 \times 10^4$ coil turns on each square-centimeter level of the stack of 25 coil levels or layers. With l=0.044 [m] and B=0.26 [Tesla], ni=$9.1 \times 10^3$ [amp turns]. For n=$25 \times 2 \times 10^4 = 5 \times 10^5$, i=$9.1 \times 10^3/5 \times 10^5$=0.018 [amps] or 18 milliamperes. The total length of 15-micrometer-diameter gold wire across any given layer or level is 100(rows)×100(coil & jumper/time-delays)×(600 micrometers)=6 [m]. For the 25 layers or levels there will 150 [m] of wire with a resistance of 150[m]×135[ohms/m]=$2.025 \times 10^4$ [ohms]. Since on average every other pulse or current interval across a conductor wire will carry no current, since in order to modulate the GW some pulses or current intervals in the train will be missing, the heat loss per centimeter of chip stack or semi-conductor layers is $$(1/2)i^2 R = 3.28 [\text{watts}]. \quad (11)$$

This heat loss can be reduced by 32% by using 25-micrometer-diameter wires for the time-delay jumpers, but high-temperature superconductors for this purpose are contemplated. In addition there may be some energy loss or resistance occasioned by electromagnetic radiation (EM) generated during the GW generation process. Such a loss can be reduced by the design of the energizing, for example coil, elements and controlling the direction of current pulses by the IIPCS. By the way, EM radiation can be easily screened out by means of interposing a conductor in the GW path, which is opaque to EM radiation but transparent to GW.

The spin-up/down of the entire rim is not instantaneous and is anticipated to progress at the speed of light in the rim from the juxtaposed permanent-magnet sites on the rim acted upon by the coil-magnetic fields. (Spin up/down does not progress at the local speed of sound, but rather it is expected to progress at the speed of light like a signal being transmitted by pushing a frictionless rod. That is, all of the ferromagnetic molecules comprising the magnets on the periphery of the rim move in concert, as the GW crest moves through the magnets at light speed, impelled by their magnetic fields. On the other hand, impulsive stresses in the spindle or dumbbell device are propagated inwardly at the speed of sound in the material of the device rather than at the speed of light.) Thus, for example, at a one picosecond cycle or switching rate an in-rim light speed of $3 \times 10^8$ [m/s] some $(10^{-12})(3 \times 10^8)=0.0003$ [m] or 0.3 [mm] or 300 micrometers of the rim on each side of the juxtaposed coil/magnet activity sites will respond (spin up or down) during each picosecond after coil activation. This process, in the case of a dumbbell-shaped rim, will generate an ever widening fan of gravitational waves, 51 as exhibited in FIG. 8B of the parent patent. Many more than the 4,290 coil sites of the exemplar device of the parent patent could be distributed around the rim (perhaps over only a single sector or selected sectors adjacent to the rim; thereby greatly reducing the required number of coils and "focusing" the GW). A large number of ultra-fast switches, preferably semiconductor based, would be activated simultaneously by the IIPCS coil-control computer, with communication lines of nearly equal length to all switches.

(3) Rim Material Accelerations

A random series of positive and negative jerks tend to build up a positive acceleration over time by random walk. Consider an extreme case, however, in which the maximum jerk builds up rim acceleration (spin up, or deceleration, spin down) continuously over a length of time, $\delta t = 10^{-7}$ [s] or 100 nanoseconds. The mass per unit length of the magnetic mass of the rim for the exemplar device of the parent application is $\Delta mass/\Delta l = 3.83$ [kg/m]. The jerk is $$da/dt = d^3S/dt^3 = ([\Delta f/\Delta l]/[\Delta mass/\Delta l])/\Delta t = (3000[N/m]/3.8[kg/m])/10^{-12} = 7.89 \times 10^{14} [m/s^3], \quad (12)$$

where S is the displacement. Therefore, in $\delta t = 100$ nanoseconds ($10^{-7}$ [s]) of continuous and constant jerk, da/dt, the acceleration, a, would build up to $$a(t) = \int_o^{\delta t}(da/dt)dt = (7.89 \times 10^{14})(10^{-7}) = 7.89 \times 10^7 [m/s^2], \quad (13)$$

(of course, control of the jerks by the IIPCS would never allow such a high build up of acceleration) the speed would build up to $$dS/dt = \int_o^{\delta t}(da/dt)dt = (da/dt)\delta t^2/2 = (7.89/2) \times 10^{14} \times (10^{-7})^2 = 3.9 [m/s], \quad (14)$$

and the displacement would build up to $$S = \int_o^{\delta t}(ds/dt)dt = (da/dt)\delta t^3/6 = (7.86/6) \times 10^{14} \times (10^{-7})^3 = 1.315 \times 10^{-7} [m]. \quad (15)$$

The angular rate build up over 100 nanoseconds is 3.9[m/s]/1000[m]=$3.9 \times 10^{-3}$[radians/s] versus, for example, the mean motion of double star PSR1913+16 of $2.25 \times 10^{-4}$ [radians/s]. Thus there is considerable "motion" in the magnetic mass, but essentially the mass goes only a very short distance. In this regard, as already noted, the IIPCS can be programmed to ensure that there is not a secular increase or accumulation of magnetic-mass displacement beyond a certain prescribed limiting value. For example, if the jerk were reversed every two seconds (reciprocating) then the acceleration would build up to less than 200 [g's]. The stress moves away from the magnetic mass at sound speed (for example, 5000 [m/s]) or about 500 micrometers in 100 nanoseconds. They represent microscopic shock waves that will dissipate.

Radial-Jerk GW Generation Embodiment

In the case of the radially directed pulses or displacements of the rim or rim sector or sectors, they result in a time-variable value of the moment of inertia, I. These displacements are built up in the radial direction by the sequential activation of radial arcs of coils in a given, single wedge-shaped sector or juxtaposed sectors of the rim or dumbbell. Under the control of the IIPCS, radially oriented strips of the aforementioned circuit-board or computer-chip rolls are sequentially activated to build up or generate a $(d^3I/dt^3)^2$ formulation or GW component as the GW moves outward at light speed. The radial displacements should be asymmetrical (as controlled by the IIPCS) in order to produce a quadrupole moment or so that the GW will not cancel out. The astrophysical analogy here is a vibrating white dwarf star emitting GW (see, for example, D. H. Douglas, p.491, of L. L. Smarr, opcit).

As is well known and noted in specifics by Geoff Burdge, Deputy Director for Technology and Systems of the National Security Agency (written communication dated Jan. 19, 2000) "Because of symmetry, the quadrupole moment can be related to a principal moment of inertia, I, of a three-dimensional tensor of the system and . . . can be approximated by $$-dE/dt \approx G/5c^5 (d^3I/dt^3)^2 = 5.5 \times 10^{-54} (d^3I/dt^3)^2." \quad (16)$$

In which k in Burdge's notation is G and the units are in the MKS system [watts] not the cgs. In this case $$P = -G\kappa_{I3dot}(d^3I/dt^3)^2/5c^5 [\text{watts}] \quad (17)$$

where $I = \delta m \ r^2 \ [\text{kg-m}^2]$, $\delta m$ = mass of an individual rim sector or a number of sectors (or dumbbell) [kg], and r = half of the distance between opposing $\delta m$ [m]. Thus $$d^3I/dt^3 = \delta m \ d^3r^2/dt^3 = 2r\delta m \ d^3r/dt^3 + \ldots \quad (18)$$

and $d^3r/dt^3$ is computed by noting that $$2r\delta m \ d^2r/dt^2 = 2rf_r[\text{N-m}] \quad (19)$$

where $f_r$ = radial force on a single rim sector, rim sectors, or dumbbell. (This single-sector embodiment of the invention can also be visualized as a linear motor.)

The derivative is approximated by $$d^3I/dt^3 = 2r\Delta f_r/\Delta t, \quad (20)$$

in which $\Delta f_r$ is the nearly instantaneous increase in the radial force on the rim caused by the magnetic field when it is turned on and off or pulsed by the transistors or ultra-fast switches of the IIPCS, that is, a radial jerk. In this regard the coils are sequenced radially outward by the IIPCS (at the speed of light) in order to generate or build up the high-frequency gravitational waves. Thus $$P = -5.5 \times 10^{-54} \kappa_{I3dot} (2r\Delta f_r/\Delta t)^2 [\text{watts}]. \quad (21)$$

Again, $\kappa_{I3dot}$ will be a function determined experimentally to account for the fact that r may not be less than the GW wavelength for most high-frequency GW of interest.

As a numerical example, for a spindle similar to the one mentioned in the prior numerical example, but with a one-meter wide apron of peripheral magnets and IIPCS coil sets both top and bottom (thus 2×100 cm/m=200 times more force per meter along the rim's periphery), $\kappa_{I3dot}=32$, $\Delta f=3.6 \times 10^9$ [N], r=1000 [m] and $\Delta t=10^{-12}$ [s], so that (pending experimental verification)

$$P = -1.76 \times 10^{-52} (2 \times 1000 \times 3.6 \times 10^9/10^{-12})^2 = -9.12 \times 10^{-3} [\text{watts}] \quad (22)$$

Again the reference area is 63 [m²], so that the GW energy flux near the device is about $1.45 \times 10^{-4}$ [watts/m²].

Single-Sector or Linear-Motor, Tangential-Jerk GW Generation Embodiment

Figure 2:
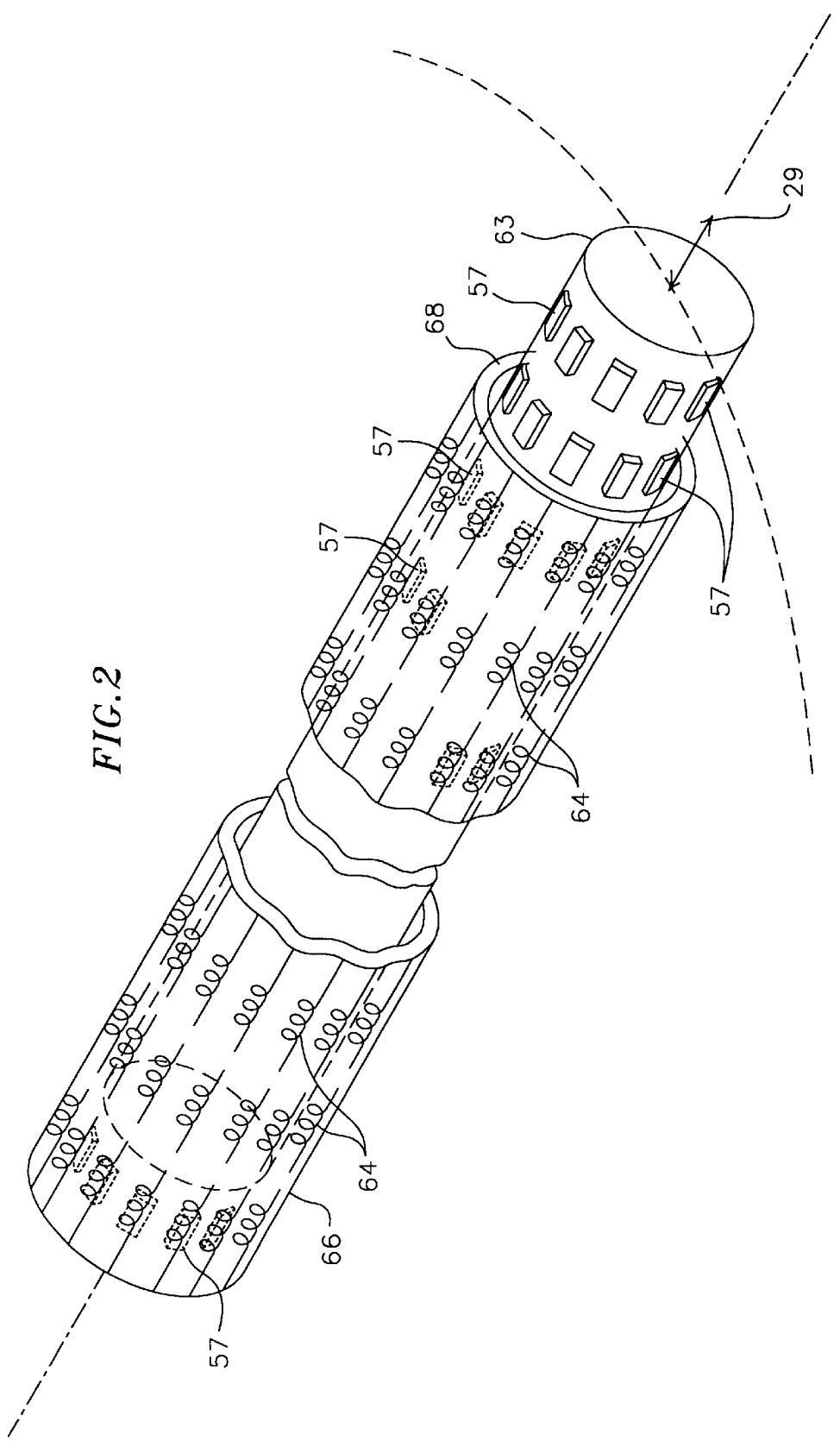
FIG. 2 is a schematic view of a single-sector or linear-motor embodiment of a gravitational-wave-generator device. The sector refers to the sector of the annulus in the plan view of the rim of the spindle device shown in the parent patent, U.S. Pat. No. 6,160,336 and is, therefore, a single, isolated segment of the rim. A sheath 68 of coils, embedded in semiconductor chips 57 individually or collectively connected to computer controlled transistor or ultra-fast switches, surrounds a central magnetic-mass composed of magnetic sites 57 incorporated with core, piston, or barrel 63.

The single-sector or linear-motor embodiment of the invention (sometimes referred to as a linear induction motor or LIM) is the most preferred embodiment of the invention. It can be visualized to involve a single sector of the rim with the impulsive forces being tangential rather than radial. Alternatively, it can be conceptualized as the rim magnets and adjacent coils being peeled off from the rim and laid out flat. In this case an exemplar device would be 2000 [m] in length and 3 [m] in diameter. The approximately one-centimeter-wide chip rolls would be placed longitudinally along the sides of central, cylindrical, permanent- (or electro-) magnetic core, piston, or barrel as shown in FIG. 2. Each meter-long segment of the roll would produce about 3000 [N] of longitudinal force, $f_l$, and all together they form a sheath of sub-millimeter coils surrounding the central magnetic core, piston, or barrel consisting of magnetic sites. Note that in this case the motion of the magnetic mass is asymmetrical (either "in" or "out") so that there is a quadrupole and the GW do not cancel and become null. The IIPCS controlled current can proceed in either direction and in the single-interconnecting-line-of-coils embodiment of the invention alternative coil lines can be energized by pulse trains moving in opposite directions to vibrate the magnetic mass. The magnetic mass itself can be composed of electromagnets, with or without cores, that can be controlled by the IIPCS to augment the GW generation.

(1) Numerical Example

As a numerical example, there would be about one roll or 25-layer strip of chips spaced around and adjacent to the barrel in a longitudinal direction (parallel to the barrel axis) every 2 centimeters forming the sheath. Thus there would be $\pi \times 3[\text{m}] \times 100[\text{cm/m}]/2[\text{cm}] = 471$ strips, 2000 [m] long or $$\Delta f_l = (471)(2000[\text{m}])(3000[\text{N/m}]) = 2.83 \times 10^9 [\text{N}] \quad (23)$$

and with $\kappa_{mr3dot}=32$ (to be established experimentally), $$P = -1.76 \times 10^{-52} (2 \times 2000 \times 2.83 \times 10^9/10^{-12})^2 = -2.26 \times 10^{-2} [\text{watts}]. \quad (24)$$

Thus, with the reference area of the two 3 [m] diameter ends, $2\pi(1.5)^2 = 14$ [m²], (GW propagating in both directions) the generated GW flux is about $1.6 \times 10^{-3}$ [watts/m²].

(2) Sector-Material Accelerations

In this case the jerk is obtained from $$(da/dt)_{per \ unit \ area} = (\Delta f/\Delta t)/(\Delta mass/\Delta A) \quad (25)$$

where $\Delta f = \Delta f_l \ [\text{N}]/(2000[\text{m}] \times 3[\text{m}]\pi) = 2.83 \times 10^9/1.885 \times 10^4 = 1.5 \times 10^5 \ [\text{N/m}^2]$, so that $$\Delta f/\Delta t = 1.5 \times 10^5/10^{-12} = 1.5 \times 10^{17} [\text{N/m}^2\text{-s}] \text{ and} \quad (26)$$

$\Delta mass/\Delta A$ = mass per area (3.8 [kg/m] of strip) (471 strips per meter)=$1.79 \times 10^3$ [kg/m²], so that da/dt=$1.5 \times 10^{17}/1.79 \times 10^3 = 8.38 \times 10^{13}$ [m/s³]. Therefore, in 100 nanoseconds of continuous jerk the acceleration would build up to $$a = d^2S/dt^2 = (da/dt)\delta t = (8.38 \times 10^{13})(10^{-7}) = 8.38 \times 10^6 [\text{m/s}^2]. \quad (27)$$

As already noted, the IIPCS would be programmed so that accelerations would never approach this value! As an example, for a one THz alternating jerk the acceleration would only build up to $(8.38 \times 10^{13})(10^{-12}) = 83.8$ [m/s²]=8.6 [g's] (alternating or reciprocating "hammer blows" acting on a single mass or masses (such as magnetic sites); not harmonic oscillation of two masses). In the extreme case of 100 nanoseconds of continuous jerk in the same direction, the speed would build up to $$dS/dt=(da/dt)\delta t^2/2=(8.38\times10^{13})\times10^{-14}=0.42[m/s] \quad (28)$$

and the displacement of the magnetic mass (magnetic surface of single sector, piston, or barrel) is $$S=(da/dt)\delta t^3/6=(8.38\times10^{13}/6)\times10^{-12}=1.40\times10^{-8}[m]. \quad (29)$$

Again there is considerable "motion" of the magnetic mass, but it goes a very small distance before the IIPCS reverses the built-up acceleration, speed, and displacement.

Infinite-radius Coil GW Generation Embodiment

For comparison with the foregoing embodiments of the invention, consider the evolution of coil pairs or coil sets into flattened-out pairs of parallel wires (that is, infinite-radius coils) situated very close to each other and carrying a large current in the same direction (and, therefore, attracting each other). This current, which can go either way, is to be pulsed by a large number of ultra-fast switches or transistors 58 (FIG. 3) about every picosecond by the IIPCS to produce pulses of electrical current through the wires. For simplicity, as an example consider the wires to be flat, one-meter square plates (therefore a one-square-meter GW reference area or smaller (e.g., in order to achieve $r<<\lambda_{GW}$) down to a current-pulse wavelength across or made larger by constructing a mosaic of individual plate pairs) as exhibited schematically in FIG. 3. As a numerical example, let each plate carry a one-thousand ampere current and the plates in the pairs are situated one-micrometer ($10^{-6}$ [m]) apart and the pairs are separated at a greater distance, say, 0.1 [mm]. In order to achieve asymmetrical mass displacement (to produce a quadrupole moment) one plate of each pair or of each "coil set" could be considerably more massive than the other, that is, exhibit a considerably larger cross section or be joined to a ballast 67 in FIG. 3 or carry a much larger current than the other or have different modulus of elasticity or be constrained differently in their mountings. If the IIPCS pulsed these conducting plates with picosecond-duration pulses, then during each cycle the attractive, impulsive force (lateral jerk) for each coil pair or set of coil pairs would be $$\Delta f=(\mu_o/2\pi)\,(1000[amps]\times1000[amps])/10^{-6}[m]=2\times10^5[N]. \quad (30)$$

The IIPCS-controlled switches 58 in FIG. 3, will sequence the current pulses 59 moving approximately at light speed, c, to build up a gravitational wave 29.

Let GW-radiated power be given by $$P=G(md^3r^2/dt^3)^2/5(c/2)^5\;G(\Delta f/\Delta t)^2/5(c/2)^5=1.76\times10^{-52}(\Delta f/\Delta t)^2\;[watts], \quad (31)$$

where $\Delta f/\Delta t=2\times10^5/10^{-12}=2\times10^{17}$ [N/s]. Thus, pending experimental verification:

$$P\;1.76\times10^{-52}(2\times10^{17})^2=7.04\times10^{-18}[watts] \quad (32)$$

and since the reference area is two square meters (GW propagates into and out of the plates) the GW flux=3.5× $10^{-18}$ [watts/m²]. The product of the amperage of, say, two plates would need to go up by a factor of about $10^5$ (to about one-million amperes) or the distance between the plates reduced by the same factor (to ten picometers or $10^{-11}$ [m]), or the number of plate pairs increased by a factor of a thousand, or a mosaic of many plate pairs per level (and multiple levels), or some combination thereof in order to approach the GW-flux values for the other embodiments of the invention. Such a current is, however, exceeded by the eighteen-million-ampere current passed through the Sandia Laboratory Z-pinch machine (A. Wilson, "Z Mimics X-rays from Neutron Stars", *Science*, Volume 286, Dec. 10, 1999, p. 2059). The current-produced jerk of this machine would be expected to generate a GW pulse as its tungsten wires collapse on each other, if they do so in an asymmetrical manner.

Electromechanical-force GW Generation Embodiment

At one THz the GW wavelength is $3\times10^{-4}$ [m] or 300 micrometers so that the half wavelength and the optimum crystal dimension according to Joseph Weber, p. 313, 1960 opcit, is 150 micrometers and, of course, even smaller for the approximate quadrupole equation to hold. If the ensemble of electromechanical elements, for example, piezoelectric crystals, were controlled by the IIPCS and replaced the coils, and were on 160 micrometer centers in the chips, then there would be about $60\times60=3.6\times10^3$ per square centimeter. If there were 25 chip levels or layers, then there would be about $25\times3.6\times10^3=9\times10^4$ crystals per square centimeter or $9\times10^9$ per [m²] as shown schematically in FIG. 4. The energy would be $10^{-20}$ [watts] per crystal (if each driven just below its breaking point as enhanced by low-temperature and high-frequency operation) multiplied by $9\times10^9$ (crystals)$\cong 10^{-11}$ [watts] (subject to experimental verification) . With the crystals properly oriented and programmed by the IIPCS to propagate GW radiation out of the side of the centimeter-thick, one-meter-square crystal array (whose area is about one centimeter by one meter, that is a reference area of $2\times10^{-2}$ [m²]) the GW flux would be $1/2\times10^{-11}/10^{-2}=5\times10^{-1C}$ [watts/m²]. As noted by Joseph Weber (ibid), such a system could be employed " . . . to generate and detect gravitational radiation." (Emphasis added.) With regard to detection, the crystals would represent very small resonators whose natural frequencies were in the terahertz range. Alternatives to the preferred embodiment of the invention using piezoelectric crystals (or piezoelectric polycrystalline ceramics), include, but are not limited to either P or N processed strain-gage silicon semiconductors, thin-film piezoelectric resonators, electromechanical nanomachines, capacitors, dielectric resonators, solenoids and piezoelectric polymers. Electromechanical nanomachines are such devices as piston actuators, motors, vibrators and pumps. For specific design details either G. L. Wojcik, et al, "Electromechanical Modeling Using Explicit Time-Domain Finite Elements", *IEEE* 1993 *Ultrasonics Symposium Proceedings*, Volume 2, pp. 1107–1112 or Jan Kocback's "Finite-Element-Modeling Analysis of Piezoelectric Disks,—Method and Testing", Master of Science Thesis, Department of Physics, University of Bergen, Bergen, Norway, can be utilized.

As discussed in detail in the 1960 and 1964 Joseph Weber articles referred to above, the passage of a gravitational wave deforms an object or set of objects as it passes through them. For example, a piezoelectric polymer, a silicon semiconductor, a thin-film piezoelectric resonator, a piezoelectric-crystal functioning as a collector element is deformed by a GW and produces a small electrical current. Likewise, the plates of a capacitor functioning as a collector element are slightly moved relative to each other and thereby produces a signal. In fact, these elements are both energizable and generate GW and also are collectors and detect GW through the same conductors. The nanomachine collectors operate in a similar fashion. A nanomachine is a microscopic or molecular sized machine, for example, a microscopic version of the dumbbell motor/generator of the parent patent. As a GW passes through the collector, the dumbbell moves slightly and submicroscopic coils respond to this motion and generate a small current. Likewise, energizing the microscopic coils in the motor mode will generate GW due to dumbbell motion. Electrical transducer or micro strain gauge nanomachines respond to the deformation occasioned by the passage of a GW in exactly the same fashion as it does to a mechanically induced strain and thereby function as a GW collector. The nanomachine pressure transducer collector element responds to a slight change in pressure of a set of particles comprising a fluid as the GW passes through it. The location of the collector elements and their connection with ultra-fast switches or transistors is identical to the location of the energizer elements, shown in FIG. 4 and, as already noted may be one and the same element acting as either an energizer or a collector.

Communication Utilizing GW

As an approximate numerical example related to a possible gravitational-wave detector for a train of high-frequency, THz, gravitational waves, consider the absorption cross section, a [m$^2$], for such antennas as given by Joseph Weber (opcit, 1964, p.99)

$$\sigma = 15\pi G I Q \beta^2 N^2 / 8\omega c \, [m^2] \tag{33}$$

where $G=6.67423\times10^{-11}$ [m$^3$/kg-s$^2$] (universal gravitational constant), I=moment of inertia or quadrupole moment of the detector element(s) [kg-m$^2$], Q=$\pi$ times the number of oscillations a free oscillator undergoes before its amplitude decays by a factor of e, $\beta=2\pi/\lambda$ [1/m] (propagation constant), $\lambda=c/\nu$ [m] (gravitational-wave wavelength), N=the number of quadrupoles coupled together in the antenna (see Eq. (2.9A), p.62, of *Gravitational Radiation and Relativity*, Edited by J. Weber and T. M. Karade, World Scientific Publishing Co., Singapore, 1986), $c=3\times10^8$ [m/s] (the speed of light), $\nu$=frequency of gravitational radiation [1/s or Hz], and $\omega$=angular frequency (or mean motion) [1/s].

For Q=$10^6$ (as noted by Joseph Weber opcit, 1960, p. 308, "A practical antenna might be expected to have Q≈$10^6$." A large Q implies that a long time is required for the quadrupole element to reach thermal equilibrium. Also, the detection devices that Weber had in mind were large isolated aluminum cylinders, suspended and well isolated from the environment. The collector elements for the present device will probably be contained on a chip with damping constraints and a much smaller Q is likely).

$\nu=10^{12}$ [Hz] or one [THz], and $\beta=2\pi\nu/c=2.09\times10^4$ [1/m], and $\omega=\nu/2=5\times10^{11}$ [1/s]; see Weber, 1964, opcit p. 90, we have $\sigma=1.15\times10^{-15}$ IN$^2$[m$^2$].

This value, depending upon I and the number of quadrupoles (with masses and characteristics nearly identical) coupled together in the antenna, N, compares favorably with $\sigma=10^{-20}$ [m$^2$] of the Weber Bar given on p. 102 of Weber , ibid.

An approximate estimate of what bandwidth a gravitational-wave (GW) communication system might achieve is obtained as follows: Suppose that the distance between the GW generating or transmitting device and the receiver or detector is about one Earth's radius, 7,000 [km] or 7000 rim radii. Also, suppose that we are transmitting through the Earth's mantle and that 10 percent of the GW energy gets through. Thus, for the tangential-jerk situation the "signal" obtained by modulating the current pulses by the IIPCS (some pulses missing and some forming a longer-duration pulse or pulses of different amplitudes) is using the power near the spindle device given by Eq. (9) and the average power flux of $2\times10^{-9}$ [watts/m$^2$] there $$S=(2\times10^{-9})(0.1)/7000=2.8\times10^{-14}[\text{watts/m}^2] \tag{34}$$

at the receiver or detector (assuming that the GW propagates in a single plane with little or no diffraction). For the radial-jerk spindle situation using the power near the device given by Eq. (22) and the average power flux of $1\times10^{-4}$ [watts/m$^2$] there $$S=(1\times10^{-4})(0.1)/7000=1.4\times10^{-9}[\text{watts/m}^2]. \tag{35}$$

For the longitudinal-jerk, linear-motor situation with average power from Eq. (24) (if there were a fall off with range in "rim" radii), with a 2000 [m] length or radius of gyration and a resulting average power of $1\times10^{-3}$ [watts/m$^2$] we have, $$S=(1\times10^{-3})(0.1)/7000=1.4\times10^{-8}[\text{watts/m}^2]. \tag{36}$$

Let us estimate the "noise" N=$10^{-20}$ [watts/m$^2$] in the THz band(probably not many GW sources there, but Brownian motion, thermal and quantum fluctuations, etc. may result in much more noise than this) and that the GW detector exhibits a sensitivity on this same order. It should be recognized, however, that the bandwidth of the long-base-line, interferometric GW detectors now under construction are at most about a few kHz and they are not designed for THz detection. Furthermore, a six to ten order-of-magnitude improvement of the sensitivity of the single-crystal detectors considered by Joseph Weber 42 years ago might need to be accomplished (sensitivity of about $10^{-10}$ [watts] as given on p. 313 of Weber opcit, 1960). More recently, however, Weber has speculated optimistically (opcit, 1986, p. 30) that there is " . . . no limit to the theoretical sensitivity of a (elastic solid) gravitational radiation antenna, and perhaps no limit to the number of novel methods for improving the sensitivity of existing antennas."

Using Shannon's classical equation (C. B. Shannon, *Bell Systems Technical Journal*, Volume 27, Number 379, p. 623, 1948), the maximum rate of information transfer, C, for the spindle's tangential-jerk GW embodiment is given by $$C=B\log_2(1+2.8\times10^{-14}/10^{-20})\cong(10^{12})(20)=2\times10^{13}[\text{bps}], \tag{37}$$

for the radial-jerk GW embodiment $$C=B\log_2(1+1.4\times10^{-9}/10^{-20})\cong(10^{12})(30)=3\times10^{13}[\text{bps}] \tag{38}$$

and for the longitudinal-jerk (linear-motor) GW preferred embodiment $$C=B\log_2(1+1.4\times10^{-8}/10^{-20})\cong(10^{12})(40)=4\times10^{13}[\text{bps}]. \tag{39}$$

In each embodiment the bandwidth, B, is taken to be the IIPCS switch on-off or "chop" rate of about $10^{12}$ reciprocating "hammer blows" or jerks per second (one THz and multiple GW generators or "transmitters" could increase the bandwidth further).

There exists a useful figure-of-merit or trade-off function for the longitudinal-jerk (single-sector or linear-motor) preferred embodiment of the invention that relates to the received signal:

$$S \propto ([2\pi r l\{l\Delta f_r/\Delta A\}/\Delta t]^2/[\pi r^2])\alpha \tag{40}$$

$$(l^2[\Delta f_r/\Delta A]/\Delta t)^2\alpha \tag{41}$$

(note that the radius of the single-sector cylindrical magnetic core, piston, or barrel, cancels out) where S=signal at the detector (receiver) [watts/m$^2$], r=radius of the single-sector magnetic core, piston, or barrel [m], l=radius of the single-sector or length at magnetic core, piston, or barrel [m], $\Delta f_l/\Delta A$=longitudinal force per unit area acting on the single-sector magnetic core, piston, or barrel [N/m$^2$], $\Delta t$=impulse time [s], $\alpha$=attenuation due to intervening material between the GW generator (transmitter) and detector (receiver) [dimensionless], and assume that for the single-sector or linear-motor preferred embodiment of the invention, if there is little or no GW diffraction, then there is no range, $\rho$ dependence (to be tested experimentally).

As a numerical example, consider the solution for the length, l, $$l = \sqrt[4]{(S/\alpha)} \times (\Delta t/[\Delta f_l/\Delta A])^2 \qquad (42)$$

where

S=4.5×10$^{-4}$ multiplied by the nominal=(4.5×10$^{-4}$) (1.4× 10$^{-8}$)=6.26×10$^{-12}$ [watts/m$^2$] (assume a {1/4.5}×10$^4$ more sensitive detector or receiver), $\alpha$=10 multiplied by the nominal=(10) (0.1)=1 [dimensionless] (assume no attenuation), $\Delta t$=10$^{-1}$ multiplied by the nominal=10$^{-13}$ [s] (occasioned by the possible design of a 100 femtosecond ultra-fast switch and pulse duration), and $\Delta f_l/\Delta A$=100 multiplied by the nominal=(100) (5.64×10$^9$/ [2000×3π])=(100)(3.0×10$^5$)=3.0×10$^7$ [N/m$^2$] (assume increased magnet efficiencies due to, for example, use of high-temperature super conductors and electromagnets).

Thus, in this case the length of the GW generator would be (with the factor of 7000 rim radii removed; thus the factor of 10$^{-3}$/7)

$$l = \sqrt[4]{([6.26 \times 10^{-12}/10][10^{-3}/7]/[100/0.1]^2)} \; (2000) = 6.15 \times 10^{-3} [m] = 6.15 [mm]. \qquad (43)$$

Equation (41) can be utilized by a person with average skill in the art to practice the inventions utilizing fast or ultra-fast switches or transistors having different capabilities, that is different $\Delta t$, different detection capabilities, S, different forces, $\Delta f$, and different lengths, l including lengths significantly smaller than GW wavelength.

Propulsion

No doubt high-frequency GW experiments will reveal many applications of GW to propel spacecraft by means of remote GW generators. In this regard, on p. 349 of Landau and Lifshitz (opcit), they comment: "Since it has a definite energy, the GW is itself the source of some additional gravitational field. Like the energy producing it, this field is a second-order effect in the $h_{ik}$ (tensor describing a weak perturbation of the galilean metric). But in the case of high-frequency gravitational waves the effect is significantly strengthened . . . " (Emphasis added.)

The axis of rotation of a spindle GW-generation device defines a preferred, single, unique direction in space and also a preferred, single, unique plane. The axis of the single-sector, linear-motor GW generator device defines a preferred, unique direction in space as well. Thus there is an asphericity or pattern to the gravitational radiation, an anisotropy or focusing, that is analogous to a radio-antenna pattern of field strength. The concept that, as a part of this pattern, the gravitational waves are constrained to the "preferred" plane of the rim, or axis of the linear-motor's "preferred" line in space, without diffraction, will also be tested. These concepts have potential application to spacecraft propulsion either by remote "gravitational force field" generation or by placing anisotropic GW generators on board a spacecraft—a "Relativistic Rocket".

What is claimed is:

1. A gravitational wave generator utilizing a computer controlled logic system to produce gravitational waves by imparting a third time derivative to the motion of a mass or a system of masses.

2. A gravitational wave generation device comprising:
   a plurality of energizable elements;
   a plurality of electronic switches connected to the elements;
   a computer-controlled logic system operatively connected to a power source for selectively energizing the elements; and
   a transmitter operatively connected to the elements for selectively connecting the elements to an information processing device in a predetermined time sequence to generate gravitational waves.

3. A device according to claim 2 wherein the electronic switches are semiconductor based.

4. A device according to claim 2 wherein the plurality of elements are piezoelectric crystals.

5. A device according to claim 2 wherein the plurality of elements are silicon semiconductors.

6. A device according to claim 2 wherein the plurality of elements are thin-film piezoelectric resonators.

7. A device according to claim 2 wherein the plurality of energizable elements are piezoelectric polymers.

8. A device according to claim 2 wherein the plurality of elements are of a submillimeter size and incorporated into a semiconductor chip.

9. A device according to claim 2 wherein the plurality of energizable elements are of a submillimeter size and integrated with polymer-based devices.

10. A device according to claim 2 wherein a subset of the energizable elements are arranged in a line of such elements such that when energized by a train of current pulses, the duration of which allows the pulses to traverse a subsequent energizable element completely, and reaches the next energizable element in the line with time delays between the elements to ensure that the pulses can reach each of the elements in the line at an appropriate time to generate gravitational waves as the train of pulses progresses down the line.

11. A device according to claim 2 wherein the plurality of elements are of a submillimeter size and integrated with polymer-based devices.

12. A device according to claim 2 wherein the plurality of elements are nanomachines.

13. A device according to claim 12 wherein the nanomachines are piston actuators.

14. A device according to claim 12 wherein the nanomachines are motors.

15. A device according to claim 12 wherein the nanomachines are vibrators.

16. A device according to claim 12 wherein the nanomachines are pumps.

17. A device according to claim 2 wherein a mass or masses are is set in motion by the elements and exhibits a third-time-derivative motion of the mass or masses to produce a gravitational wave.

18. A device according to claim 17 wherein the mass or masses are a plurality of electromagnets.

19. A device according to claim 18 wherein a cylindrically shaped magnetic core mass is provided, surrounded by a sheath composed of a plurality of very small coils or coil sets, each individually controlled by computer means.

20. A device according to claim 17 wherein the mass or masses are a plurality of permanent magnets located around the rim of a spindle.

21. A device according to claim 20 wherein to a plurality of conductive wire coils or coil sets adjacent to the spindle rim are segmented into one or more separate, juxtaposed sectors.

22. A device according to claim 20 wherein the plurality of magnets located around the periphery of the spindle rim are separated into one or more separate, juxtaposed magnets.

23. A device according to claim 2 wherein the plurality of elements are electrically energizable elements.

24. A device according to claim 23 wherein the plurality of electrically energizable elements are capacitors.

25. A device according to claim 23 wherein the plurality of electrically energizable elements are dielectric resonators.

26. A device according to claim 2 wherein the plurality of elements are small conductive wire coils or coil sets.

27. A device according to claim 23 wherein the plurality of conductive wire coils or coil sets are microscopic in size and integrated with polymer-based devices.

28. A device according to claim 26 wherein the plurality of small conductive coils or coil sets are individually sequenced radially outward by current pulses to generate gravitational waves resulting from a third-time-derivative motion or jerk of a time-variable moment of inertia or mass distribution of a magnetic mass.

29. A device according to claim 26 wherein the plurality of coils or coil sets along a predetermined line of such coils or coil sets are energized by a train of current pulses, the duration of which is controlled by computer means to cause the pulse to traverse a subsequent coil or coil set completely and reaches the coil set in the line via the same single conductor wire with predetermined time delays between the coils or coil sets to ensure that the pulses reach each of the coils or coil sets in the line at an appropriate time to generate gravitational waves as the train of pulses progresses down the line.

30. A device according to claim 23 wherein the plurality of conductive wire coils or coil sets are of a very small size and encased in or imprinted on a semiconductor chip.

31. A device according to claim 30 wherein the semiconductor chip, containing the plurality of very small coils or coil sets, is layered with circuit elements sequenced to launch a magnetic-field pulse of very brief duration which interacts almost simultaneously with the electromagnetic field of a magnetic mass to cause a sufficient third-time-derivative motion or jerk of the magnetic mass to generate gravitational waves.

32. A device according to claim 31 wherein the magnetic mass is a single magnet acted upon by the plurality of coils or coil sets adjacent to it.

33. A device according to claim 2 wherein the plurality of elements are electromagnetic-force elements.

34. A device according to claim 33 wherein the plurality of electromagnetic-force elements are solenoids.

35. A device according to claim 33 herein the electromagnetic force elements are coil sets that are flattened out into one or more parallel conductor pairs situated close to one another and are pulsed with a current by computer controlled switches to produce a gravitational wave.

36. A device according to claim 35 wherein the plurality of parallel conductor pairs are arranged in a mosaic pattern or in multiple layers of a mosaic pattern.

37. A device according to claim 35 wherein the plurality of parallel conductor pairs are of microscopic size and encased in or imprinted on a semiconductor chip or integrated with a polymer-based device.

38. A device according to claim 35 wherein the plurality of parallel conductor pairs along a predetermined line of such parallel conductor pairs are energized by a train of current pulses the duration of which is controlled by computer means to cause the pulse to traverse a subsequent pair of parallel conductors completely and reaches the parallel conductors in the line via the same single conductor wire with predetermined time delays between the pairs of parallel conductors to ensure that the pulses reach each of the pairs of parallel conductors in the line at an appropriate time to generate gravitational waves as the train of pulses progresses down the line.

39. A gravitational wave detection device comprising:

a plurality of collector elements;

a plurality of electronic switches connected to the elements;

a computer-controlled logic system operatively connected to an information processing device for selectively connecting the elements in a predetermined time sequence; and a receiver operatively connected to the information processing device to indicate the detection of gravitational waves.

40. A device according to claim 39 wherein the plurality of elements are piezoelectric crystals.

41. A device according to claim 39 wherein the plurality of elements are silicon semiconductors.

42. A device according to claim 39 wherein the plurality of elements are thin-film piezoelectric resonators.

43. A device according to claim 39 wherein the plurality of elements are piezoelectric polymers.

44. A device according to claim 39 wherein the plurality of elements are capacitors.

45. A device according to claim 39 wherein the plurality of elements are of a submillimeter size and incorporated into a semiconductor chip.

46. A device according to claim 39 wherein the plurality of elements are nanomachines.

47. A device according to claim 46 wherein the nanomachines are piston actuators.

48. A device according to claim 46 wherein the nanomachines are generators.

49. A device according to claim 46 wherein the nanomachines are electrical transducers.

50. A device according to claim 46 wherein the nanomachines are pressure transducers.

* * * * *